Sept. 21, 1943.  O. B. FETTERMAN  2,329,708
PUSH RAKE
Filed Feb. 14, 1942   3 Sheets-Sheet 1
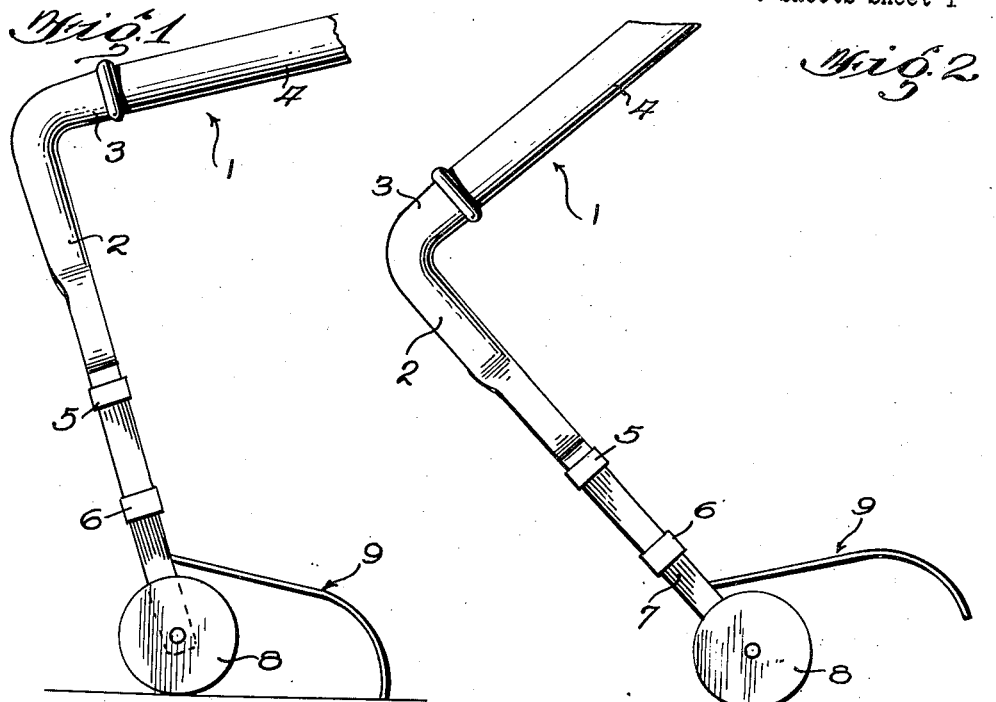
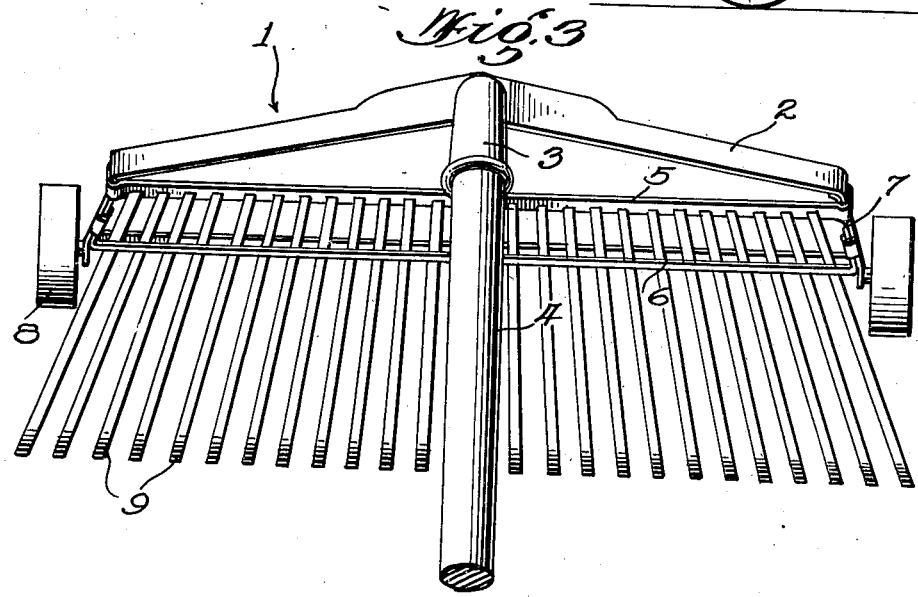
INVENTOR.
Oscar B. Fetterman
BY Robert C. Dennison
ATTORNEY

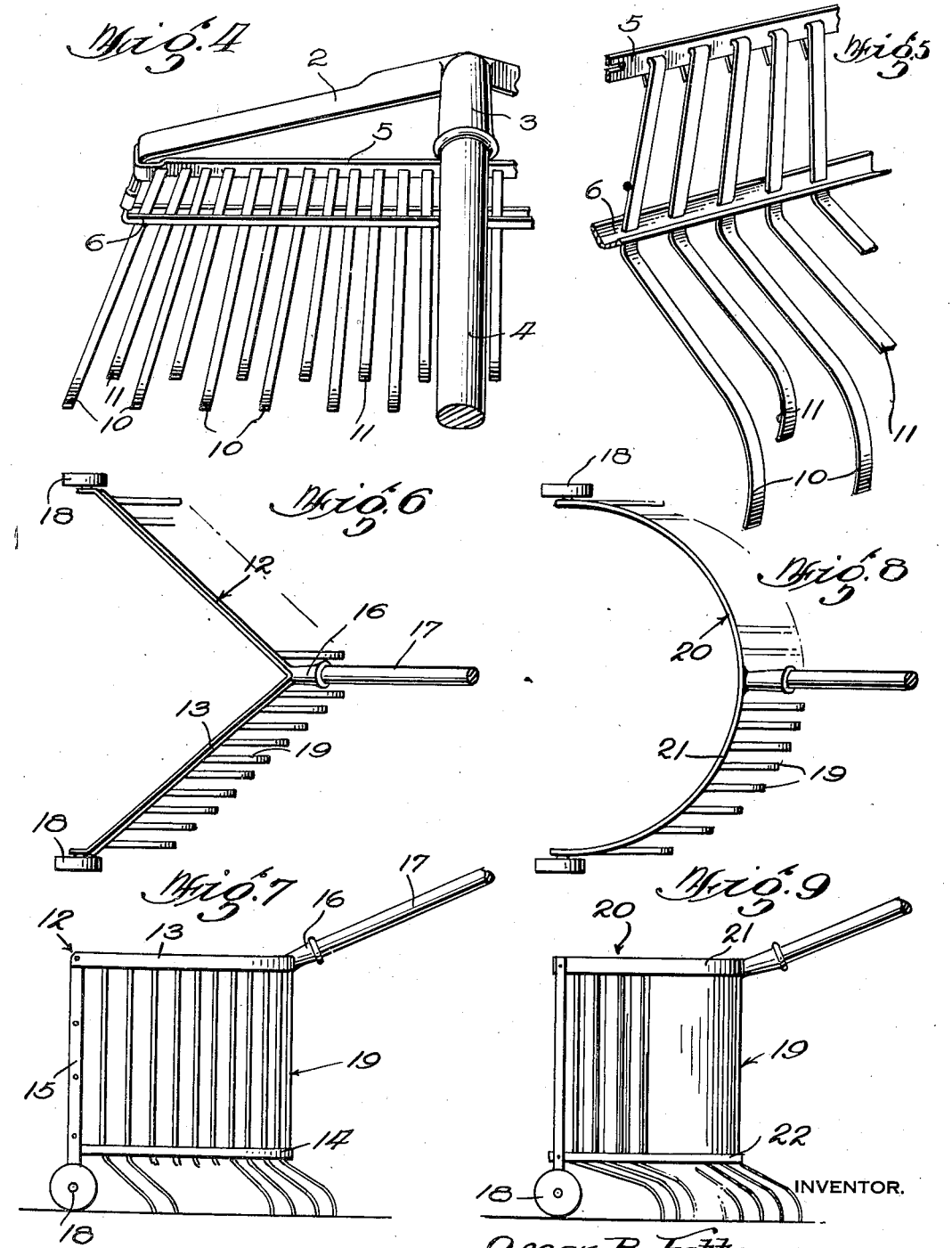

Sept. 21, 1943. O. B. FETTERMAN 2,329,708
PUSH RAKE
Filed Feb. 14, 1942 3 Sheets-Sheet 3
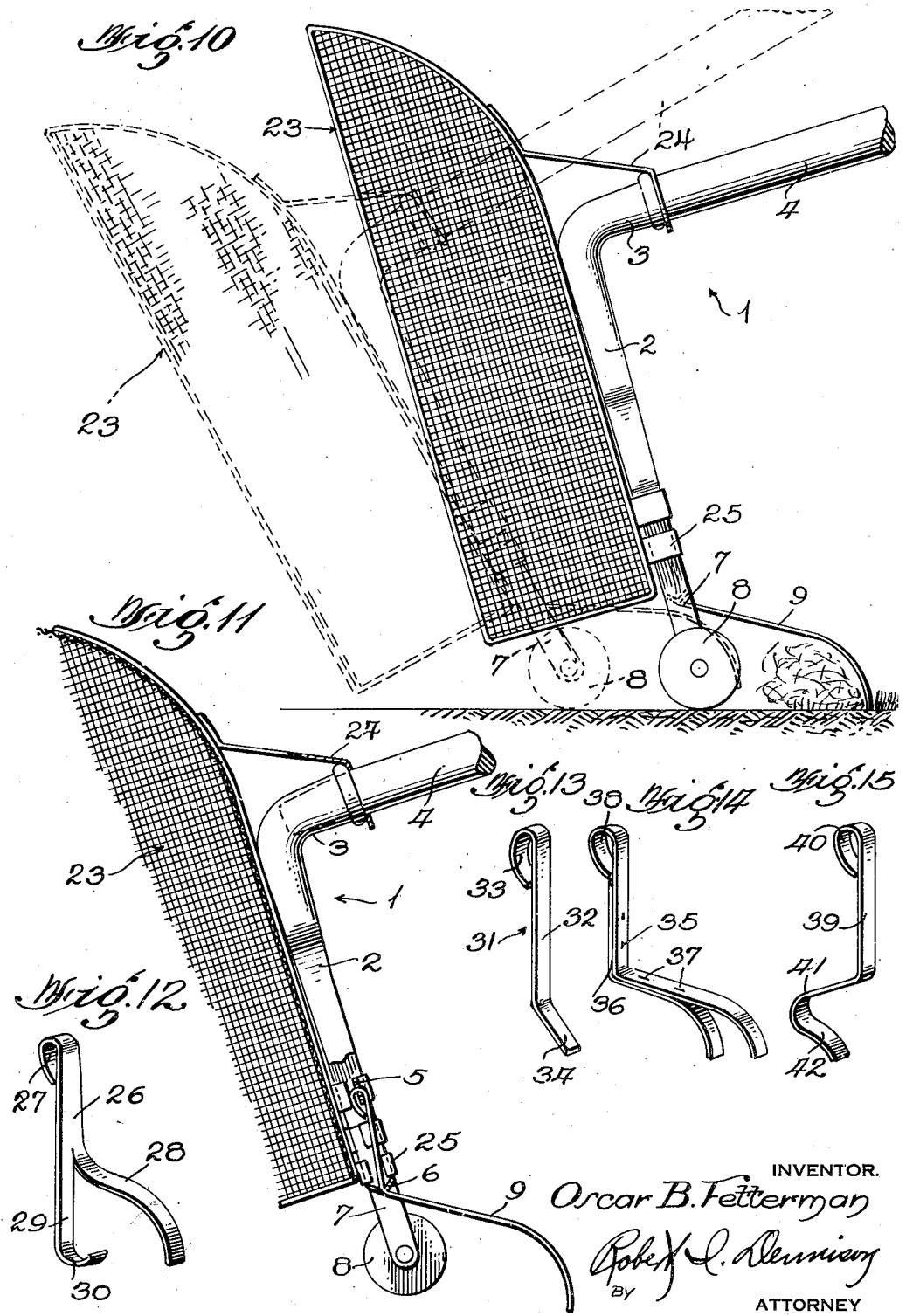

Patented Sept. 21, 1943

2,329,708

UNITED STATES PATENT OFFICE 2,329,708

PUSH RAKE

Oscar B. Fetterman, Washington, D. C.

Application February 14, 1942, Serial No. 430,964

7 Claims. (Cl. 56—400.13)

The present invention relates to improvements in rakes and has reference more particularly to a lawn rake of the push type.

One of the important objects of the invention is to provide a hand rake for removing leaves and trash from the surface of a lawn, without any possibility of the rake causing damage to the lawn.

A further object resides in the provision of a hand rake of the push type, so that the leaves and other material may be collected by the forward movement of the tines across the lawn.

A still further object is to provide a push rake that is so constructed as to permit the tines to be raised to an inoperative position while the rake is moved rearwardly over the lawn, preparatory to starting another raking and material collecting operation.

Another important object of the present invention resides in the provision of a rake of the above mentioned character that is simple in construction, inexpensive, strong and durable and at all times positive and efficient in carrying out the objects for which it has been designed.

Other objects and advantages of the invention will become apparent from the accompanying drawings and following description.

In the accompanying drawings:

Figure 1 is a side elevation of the rake showing the tines in a lowered operative position;

Figure 2 is a similar view of the rake with the tines raised to an inoperative position to permit the rake to be drawn rearwardly to a further raking position;

Figure 3 is a top plan view of my improved push rake;

Figure 4 is a fragmentary plan view showing a modification of the tine arrangement;

Figure 5 is a fragmentary perspective view of the tine arrangement disclosed in Figure 4;

Figure 6 is a top plan view of a modification of the push rake, wherein the frame and tines form a V-shaped gathering structure;

Figure 7 is a side elevation of the rake illustrated in Figure 6;

Figure 8 is a view similar to Figure 6 showing a still further modification of frame and tine design;

Figure 9 is a side elevation of the rake shown in Figure 8;

Figure 10 is a side elevation of a push rake embodying my invention, equipped with a shield at the front of the frame;

Figure 11 is a view similar to Figure 10 with parts shown in section and illustrating the manner in which the upper ends of the tines are secured, and Figures 12, 13, 14 and 15, respectively, disclose perspective views of various other modifications of the spring tines.

In the drawings, with reference more particularly to Figures 1 to 3, the numeral 1 designates generally my push rake, the same comprising a frame or rake head 2 from the top of the central portion thereof extends the rearwardly open socket 3. This socket is disposed at substantially right angles to the body of the frame and receives the forward end of the handle 4.

Upper and lower cross bars 5 and 6, respectively, are arranged between the depending sides 7 of the frame and are rigidly secured thereto in any suitable manner. Ground engaging wheels 8 are rotatably mounted on the lower ends of the side arms 7 of the frame to permit the rake to travel over the lawn more easily in the manner hereinafter more fully explained. It will also be observed that the sides of the frame diverge downwardly to produce a flared effect when the rake teeth or tines are in place on the frame.

Forming a salient part of this invention is the spring tine construction now to be described in detail.

The rake teeth or tines 9 are each formed from a flat strip of spring metal. The upper end portions of the tines are secured to the top cross bar 5 and extend down through the lower cross bar 6, so that the upper portions of the tines are disposed in substantially the same plane as the frame 2. Thus, the cross bars and the upper portions of the tines extend through an area, transversely to a horizontal.

From a point adjacent the lower cross bar 6, the tines extending rearwardly are curved downwardly as clearly shown in Figure 1, so that the lower free ends of the tines are spaced rearwardly from the frame and the ground engaging rollers 8.

As will be more clearly understood from Figure 3, the tines 9 diverge from the frame and supporting cross bars to produce a flared or fan-shaped arrangement. Also it will be observed that the major portions of the tines are free to flex to a considerable degree in their raking position.

With the rake disposed in the position shown in Figure 1, the handle 4 is grasped and the rake pushed forwardly over the lawn and the tines 9 will gather up the leaves and trash collected on the lawn and the leaves may be deposited in a suitable pile. During the raking operation, the lower ends of the tines will not penetrate into the ground below the grass and injure the same, due to the particular construction of my tines.

After a pile of leaves has been accumulated the rake may be moved rearwardly to a further raking position, by merely swinging the handle upwardly, so that the frame and tines carried thereby rock on the pintles for the wheels 8. This will raise the tines out of engagement with the ground and when the rake is in the position shown in Figure 2 the same can readily and easily be rolled back over the grass, and this without necessitating the bodily lifting of the rake off of the ground.

By again bringing the handle 4 downward, the tines 9 will be lowered to the position shown in Figure 1 whereupon the rake can again be pushed in a forward direction to cause the tines to comb through the grass and gather up additional leaves. Further, by constructing the tines in the manner shown, there will not be any tendency for the tines to pierce the leaves and thus clogging up of the tines with impaled leaves will be prevented.

With reference now to Figures 4 and 5 of the drawings, there is shown a modification of the tine arrangement, wherein alternate tines 10 are longer than the intermediate tines 11. Otherwise, these tines 10 and 11 are identical in construction and shape as the previously described tines 9.

In Figures 6 and 7 there is shown a modification of the push rake, wherein a substantially V-shaped frame 12 is employed. This frame includes upper and lower V-shaped bars 13 and 14 and connecting arms 15 at the forward ends thereof. A socket 16 extends rearwardly from the apex of the top V-shaped bar 13 for the reception of the handle 17. Ground engaging wheels 18 are rotatably mounted on the projecting lower ends of the arms 15.

The spring tines 19 include elongated vertical portions that extend between the upper and lower V-shaped bars around the entire frame and these portions of the tines may be secured in spaced relation to the upper and lower V-shaped bar in any suitable manner.

The lower free end portions of the tines extend rearwardly and are curved downwardly in the same manner as the lower portions of the tines 9 and function in the same manner as the tines 9.

By constructing the frame in this manner I provide a V-shaped pocket of suitable height within which the leaves raked up by tines 19 may be collected while the rake is being pushed forwardly over the lawn. Here again, by merely swinging the handle 17 upwardly, the frame and tines will be tilted or canted to dispose the tines in an inoperative position, permitting the rake to be pulled back over the lawn to a new raking position.

In Figures 8 and 9, a still further modification of frame design is shown. In this instance, the frame is curved to form a substantially semicircular structure denoted generally by the numeral 20. Otherwise, the construction and arrangement of tines is the same as that shown in Figures 6 and 7. It will, of course, be understood that in lieu of the upper and lower V-shaped bars, curved upper and lower bars 21 and 22, respectively, are employed.

In Figures 10 and 11 I have shown a still further modification of leaf gatherer or shield for association with my push rake. A wire mesh screen 23 that is open at its front and bottom is arranged at the front of the frame 2 and this screen shield extends from a point above the ground engaging wheels 8 to a suitable distance above the top of the frame 2. The shield is detachably or otherwise secured in position on the frame by upper and lower attaching means shown generally at 24 and 25.

This shield 23 will not interfere with the operation of the push rake and will prevent the leaves that are gathered up by the tines from falling back over the rake onto the area of the lawn that has just been traversed by the rake.

Attention is now directed to Figures 12–15, inclusive, of the drawings, wherein modifications of the tine construction are illustrated.

In Figure 12, there is shown a tine 26 formed from a strip of spring metal. The upper end is provided with the attaching loop 27 for connection with the upper cross bar of the supporting frame. The lower portion is bifurcated to form a pair of legs 28 and 29. The leg 28 is curved rearwardly and downwardly to form a leaf gathering finger similar to the lower free ends of the tines 9, heretofore described. The other leg member 29 extends straight down and terminates in a ground engaging runner portion 30. This may be used in lieu of the ground engaging wheels 8 or 18. In such instance, only the endmost part of tines need be constructed in the manner shown in Figure 12.

In Figure 13, the spring tine 31 has its body portion 32 disposed straight, terminating at its upper end in an attaching loop 33, while the lower end of the tine is disposed rearwardly and downwardly to form the spring finger 34.

Figure 14 depicts a pair of tines 35 and 36 that are disposed in superposed relation and fastened together by suitable packing means as indicated at 37. The overlying tine 35 is of greater length than the underlying tine 36 and has its upper end formed with an attaching loop 38 and the lower free end of the tine 35 extends in spaced relation and rearwardly of the complementary lower free end of the tine 36.

In Figure 15, the tine includes a straight shank or body portion 39, having an attaching loop 40 formed at its upper end, the lower end portion of the tine is disposed forwardly and slightly downward as at 41 and terminates in a rearwardly and downwardly curved finger 42.

In all of the tine modifications, it will be noted the lower free end portions are disposed downwardly and rearwardly.

It will thus be seen from the foregoing description that I have provided a hand operated push rake that will at all times be positive and efficient in its operation and due to its simplicity, the same can be manufactured at a very low cost.

While I have shown the preferred embodiment of my invention, it is to be understood that various changes in the size, shape and arrangement of parts may be resorted to without departing from the spirit of the invention and the scope of the appended claims.

Having thus described my invention, what I claim is:

1. In a push rake, a rake head including top and bottom cross bars, a series of spring tines having their upper portions secured to the cross bars, said upper portions of the tines and said cross bars extending through an area transversely to a horizontal, the lower ends of the tines being disposed rearwardly and downwardly, and handle securing means supported on at least one of the cross bars.

2. In a push rake, a rake head, a handle extending rearwardly therefrom and at an angle thereto, a series of spring tines having their upper end portions fixedly secured on the rake head, the lower ends of the tines being directed rearwardly and downwardly, ground engaging means at the sides of the rake head permitting movement of the rake over the ground in either a forward or rearward direction, said means serving as a fulcrum when the handle is raised to dispose the lower ends of the spring tines in a raised inoperative position and permit the rake to be moved rearwardly over the ground with the tines in such inoperative position.

3. In a push rake, a rake head including top and bottom cross bars, a series of spring tines having their upper portions secured to the cross bars, said upper portions of the tines and the cross bars extending through an area transversely to the horizontal, the lower ends of the tines being disposed rearwardly and downwardly, handle securing means supported on the rake head, a handle attached to said securing means, and ground-engaging means at the sides of the rake head permitting movement of the rake over the ground in either a forward or rearward direction, said last mentioned means serving as a fulcrum when the handle is raised to dispose the lower free ends of the spring tines in a raised inoperative position and permit the rake to be moved rearwardly over the ground with the tines in such inoperative position.

4. In a push rake, a rake head including top and bottom cross bars, and side portions between which the cross bars extend, a series of spring tines having their upper portions secured to the cross bars, said cross bars and the upper portions of the tines extending through an area transversely to the horizontal, the lower ends of the tines being disposed rearwardly and downwardly, handle securing means supported on the rake head, and ground engaging wheels rotatably mounted on the lower ends of the side portions of the rake head, said wheels serving as a fulcrum on which the rake head may be tilted forwardly to dispose the lower free ends of the tines in a raised inoperative position, said wheels permitting the rake to be moved rearwardly over the ground with the tines in such raised inoperative position.

5. In a push rake, a rake head including top and bottom cross bars, and side portions between which the cross bars extend, a series of spring tines having their upper portions secured to the cross bars, said cross bars, side portions and the upper portions of the tines extending through an area transversely to the horizontal, the lower ends of the tines being disposed rearwardly and downwardly, and handle securing means supported on at least one of the cross bars.

6. In a push rake, a rake head including top and bottom cross bars, and side portions between which the cross bars extend, a series of spring tines having their upper portions secured to the cross bars, said cross bars, side portions and the upper portions of the tines extending through an area transversely to the horizontal, the lower end portions of the tines being disposed rearwardly and terminating in forwardly curved ground engaging gathering fingers, and handle securing means supported on the rake head.

7. In a push rake, a rake head including top and bottom cross bars, and side portions between which the cross bars extend, a series of spring tines having their upper portions secured to the cross bars, said cross bars, side portions and the upper portions of the tines extending through an area transversely to the horizontal, the lower end portions of the tines being disposed rearwardly and terminating in forwardly curved ground engaging gathering fingers, handle securing means supported on the rake head, and a material gathering and collecting shield arranged on the rake head forwardly of and above the ground engaging portions of the tines.

OSCAR B. FETTERMAN.